(12) United States Patent
Dong et al.

(10) Patent No.: US 11,435,796 B2
(45) Date of Patent: Sep. 6, 2022

(54) POWER BACKUP DEVICE CHARGING SYSTEM

(71) Applicant: Dell Products L.P., Round Rock, TX (US)

(72) Inventors: Wei Dong, Shanghai (CN); Xizhi Cui, Shanghai (CN); Haifang Zhai, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 16/902,093

(22) Filed: Jun. 15, 2020

(65) Prior Publication Data

US 2021/0216122 A1 Jul. 15, 2021

(30) Foreign Application Priority Data

Jan. 15, 2020 (CN) .......................... 202010040662.7

(51) Int. Cl.
| | |
|---|---|
| *G06F 1/00* | (2006.01) |
| *G06F 1/26* | (2006.01) |
| *H02J 7/00* | (2006.01) |
| *H02J 9/06* | (2006.01) |

(52) U.S. Cl.
CPC ................ *G06F 1/26* (2013.01); *H02J 7/007* (2013.01); *H02J 9/06* (2013.01)

(58) Field of Classification Search
CPC ... G06F 1/26; G06F 1/181; G06F 1/28; G06F 1/30; G06F 1/263; G06F 1/20; H02J 7/007; H02J 9/06
See application file for complete search history.

(56) References Cited

U.S. PATENT DOCUMENTS

| | | | | |
|---|---|---|---|---|
| 2009/0322287 A1* | 12/2009 | Ozeki | ................... | H02J 7/0018 320/145 |
| 2013/0036320 A1* | 2/2013 | Yoshimura | .............. | G06F 1/263 713/323 |
| 2015/0377971 A1* | 12/2015 | Keating | ................ | H02J 7/0047 307/130 |
| 2021/0013730 A1* | 1/2021 | Du | ...................... | H02J 7/00302 |

\* cited by examiner

*Primary Examiner* — Xuxing Chen
(74) *Attorney, Agent, or Firm* — Joseph Mencher

(57) ABSTRACT

A power backup device charging system includes components coupled to a power supply system that is configured to supply power to the components, and a power backup device that is coupled to the components and the power supply system. The power backup device identifies a minimum power requirement for the components and sets a first charging threshold based on the minimum power requirement for the components. The power backup device then sets a second charging threshold that is higher than the first charging threshold and that is lower than a full charge level for the power backup device. In response to a charge level of the power backup device reaching the first charging threshold, the power backup device is charged, and in response to the charge level of the power backup device reaching the second charging threshold, the power backup device is prevented from charging.

20 Claims, 13 Drawing Sheets

US 11,435,796 B2

POWER BACKUP DEVICE CHARGING SYSTEM

CROSS-REFERENCE TO RELATED APPLICATIONS

This application claims priority to Chinese Patent Application Serial No. 202010040662.7, filed Jan. 15, 2020, the disclosure of which is incorporated herein by reference in its entirety.

BACKGROUND

The present disclosure relates generally to information handling systems, and more particularly to charging a power backup device for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometimes utilize power backup devices for addressing power losses to components in the server device. For example, Battery Backup Unit (BBU) devices are often provided for memory systems (e.g., Dynamic Random Access Memory (DRAM) devices) in server devices in order to provide ride-through capability for the BBU device and memory system, which refers to the ability of the BBU device to deliver usable power to the memory system for a limited time during a power loss. Conventional BBU devices provide a predetermined amount of ride-through time (typically 10 seconds) to their memory system in the event of a power loss such that, in the event power is restored within that predetermined amount of ride-through time, the memory system operates without interruption while, in the event the power loss continues beyond that predetermined amount of ride-through time, the memory system begins vaulting operations that transfer the data on the memory system to a storage system (e.g., Solid State Drives (SSDs)) in the server device. However, it has been discovered that the conventional charging operations performed on conventional BBU devices raise some issues. For example, conventional BBU devices are conventionally charged to 100% of their BBU charge capacity (e.g., to a Status Of Charge (SOC) of 100%) each time the SOC of the BBU device drops below a charge level threshold. It has been discovered that such conventional charging techniques result in the BBU charge capacity of the BBU device (e.g., a Status Of Health (SOH) of the BBU device) degrading relatively quickly, which reduces the deliverable energy available from the BBU device over time, and eventually requires replacement of the BBU device to ensure that the predetermined amount of ride-through time discussed above may be provided.

Accordingly, it would be desirable to provide a power backup device charging system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a power backup device charging engine that is configured to identify a minimum power requirement for one or more components coupled to the processing system; set, in a power backup device based on the minimum power requirement for the one or more components, a first charging threshold; set, in the power backup device, a second charging threshold that is higher than the first charging threshold and that is lower than a full charge level for the power backup device; charge, in response to a charge level of the power backup device reaching the first charging threshold, the power backup device; and prevent, in response to the charge level of the power backup device reaching the second charging threshold, charging of the power backup device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
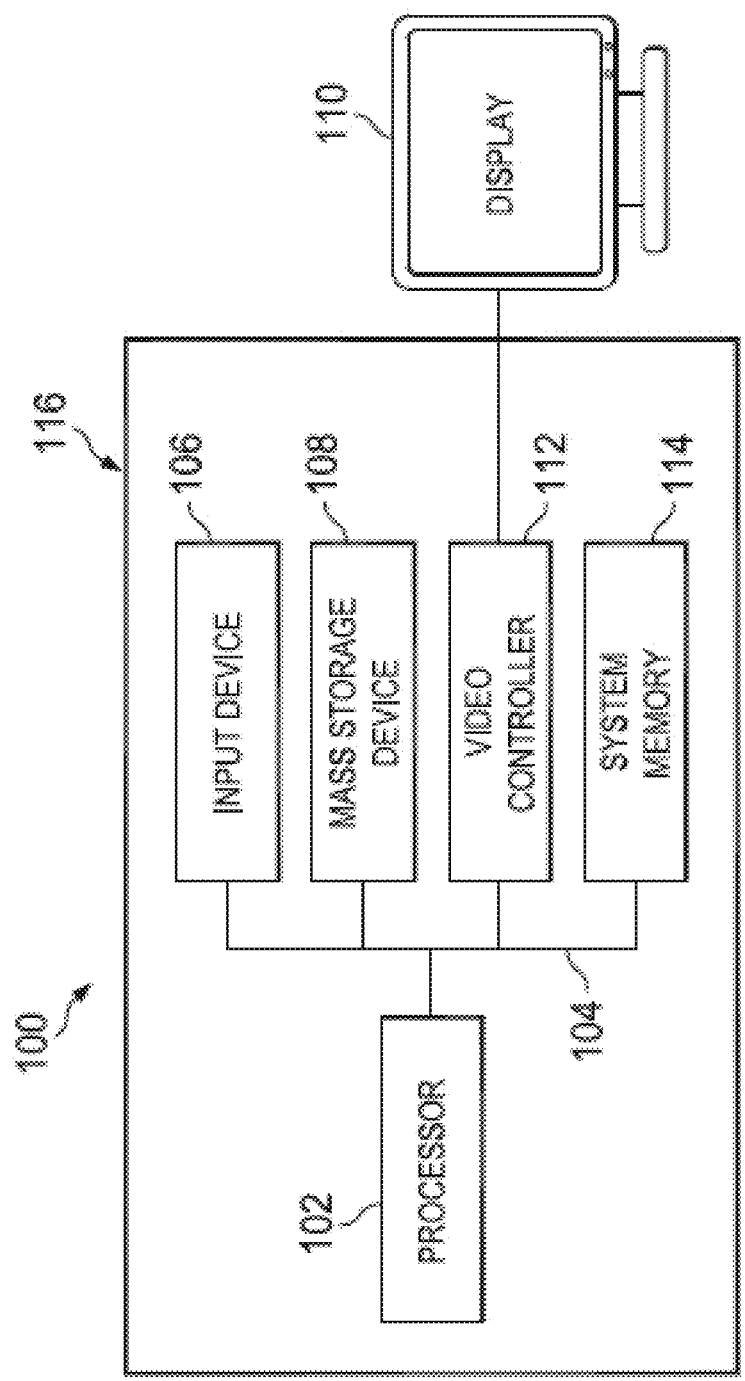
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
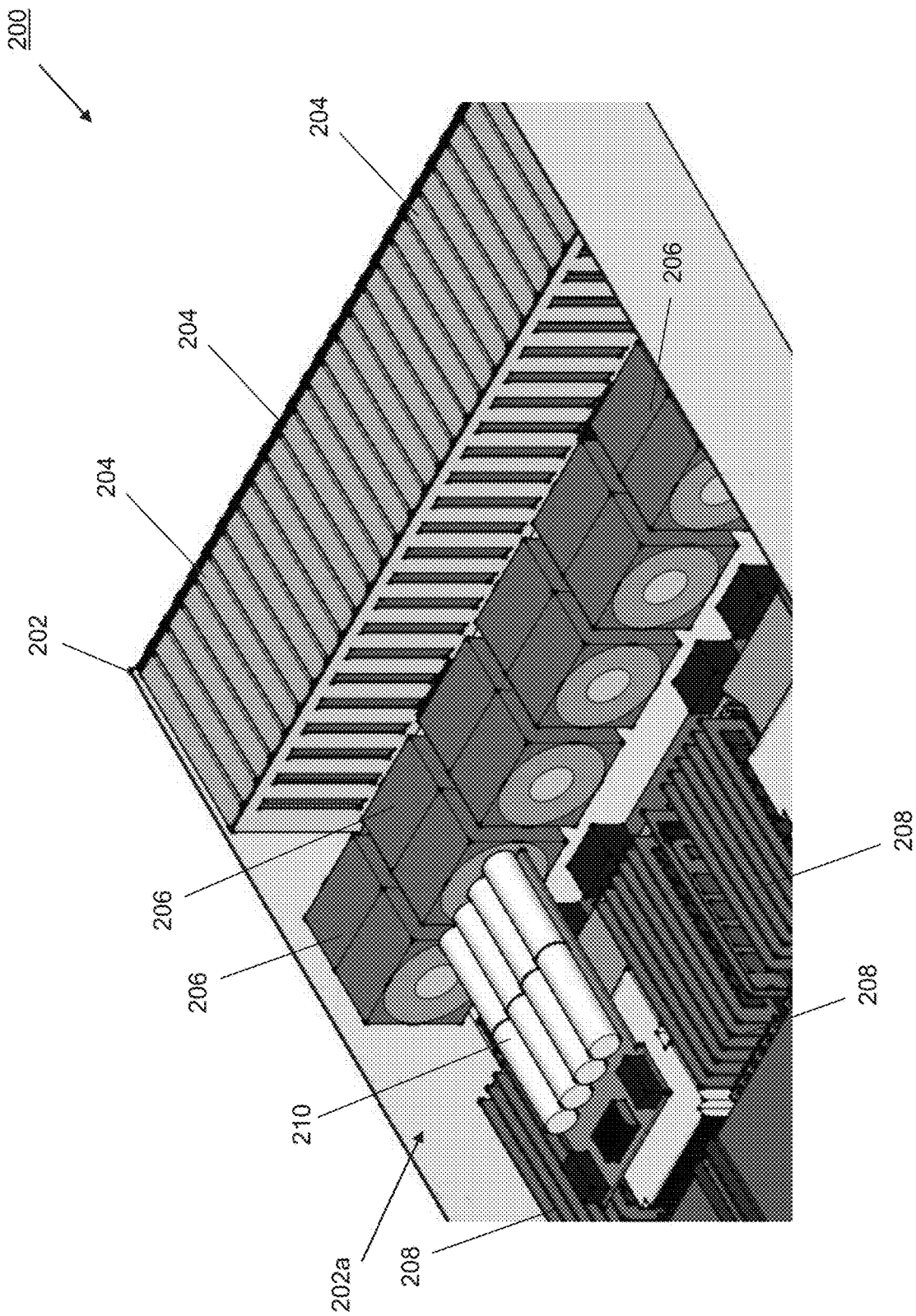
FIG. 2 is a perspective view illustrating an embodiment of a server device that may include the power backup device charging system of the present disclosure.

Referring now to FIG. 2, an embodiment of a server device 200 is illustrated. In an embodiment, the server device 200 may be provided by the IHS 100 discussed above with reference to FIG. 1, and/or may include some or all of the components of the IHS 100. However, while illustrated and discussed as provided in a server device 200, one of skill in the art in possession of the present disclosure will recognize that the power backup device charging system of the present disclosure may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 200 includes a chassis 202 that defines a chassis housing 202a which, as discussed below, may house any or all of the components of the server device 200.

In the illustrated embodiment, a plurality of components are located in the chassis housing 202a. In some examples, the components may be provided by storage devices 204 such as Solid State Drives (SSDs), Hard Disk Drives (HDDs), and/or any other storage device known in the art. However, while described as storage devices, one of skill in the art in possession of the present disclosure will recognize that the components may be provided by any server devices component known in the art while remaining within the scope of the present disclosure as well. Furthermore, FIG. 2 illustrates how the components may be provided by a plurality of fan devices 206 located in the chassis housing 202a adjacent the storage devices 204, as well as a plurality of memory devices 208. Further still, a Battery Backup Unit (BBU) device 210 is located in the chassis housing 202a and opposite the fan devices 206 from the storage devices 204. However, while discussed as a BBU device below, one of skill in the art in possession of the present disclosure will recognize that the BBU device 210 may be replaced by any of a variety of power backup device technologies while remaining within the scope of the present disclosure as well. While a specific server device 200 has been illustrated and described, one of skill in the art in possession of the present disclosure will recognize that the devices providing the power backup device charging system of the present disclosure may include a variety of components and component configurations while remaining within the scope of the present disclosure as well.

Figure 3:
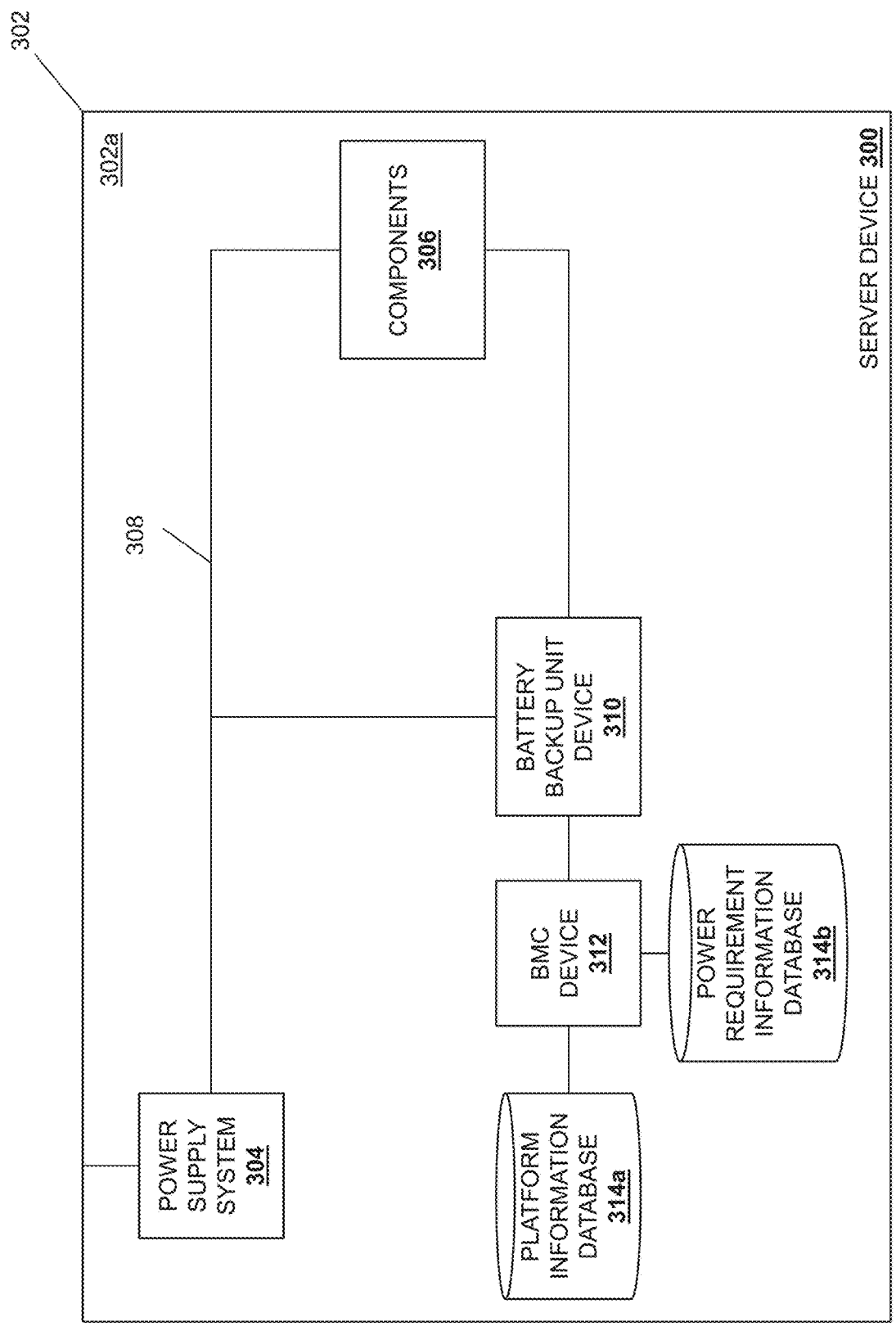
FIG. 3 is a schematic view illustrating an embodiment of a server device that may include the power backup device charging system of the present disclosure.

Referring now to FIG. 3, an embodiment of a server device 300 is illustrated that is similar to the server device 200 discussed above with reference to FIG. 2 and is provided for purposes of the examples discussed below. In an embodiment, the server device 300 may be provided by the IHS 100 discussed above with reference to FIG. 1, and/or may include some or all of the components of the IHS 100. However, while illustrated and discussed as provided in a server device 300, one of skill in the art in possession of the present disclosure will recognize that the power backup device charging system of the present disclosure may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 300 includes a chassis 302 that defines a chassis housing 302a that houses some or all of the components of the server device 300 as discussed below.

In the illustrated embodiment, a power supply system 304 is located in the chassis housing 302a and, as discussed below, may be provided by a pair of redundant Power Supply Units (PSUs) that are configured to supply power to the components of the server device 300. A plurality of components 306 are located in the chassis housing 302a and may be provided by any of a variety of server components (including the memory devices (e.g., Dynamic Random Access Memory (DRAM)) discussed herein, as well as processing systems (e.g., Central Processing Units (CPUs), storage devices, etc.) while remaining within the scope of the present disclosure. The power supply system 304 is coupled to the components 306 by a power supply coupling 308 such as, for example, a power rail (e.g., a 12 volt power rail (P12V_IN)) that is configured to deliver power from the power supply system 304 to the components 306.

As discussed below, a power backup device is located in the chassis housing 302a, and in the illustrated embodiments is provided by a Battery Backup Unit (BBU) device 310 that is coupled to the components 306 and the power supply coupling 308. The power backup device/BBU device 310 may include a processing system and a memory system that is coupled to the processing system and that includes instructions that, when executed by the processing system, cause the processing system to provide a power backup engine/BBU engine that is configured to perform the functions of the power backup devices/BBU devices discussed below. Furthermore, power backup device/BBU device 310 may also include any of a variety of power storage subsystems (e.g., batteries, capacitors, etc.) that are configured to store and deliver power as discussed below. In a specific example in which the power backup device is a BBU device 310, the BBU device 310 may include a MicroController Unit (MCU) that provides the BBU engine discussed above.

In the embodiments described in the examples below, a Baseboard Management Controller (BMC) device 312 is located in the chassis housing 302a and coupled to the BBU device 310. As discussed below, the BMC device 312 may be coupled to the BBU device 310 via an Inter-Integrated Circuit ($I^2C$) bus in a manner that allows the BMC device 312 to transmit information with the BBU device 310. In an embodiment, one or more storage subsystems (not illustrated) may be located in the chassis housing 302a and coupled to the BMC device 312, and as illustrated may include a platform information database 314a that may store platform information about a platform associated with the server device 300, a power requirement information database 314b that may store information about power requirements of the server device 300 and/or platform associated with the server device 300, and/or any other information that would be apparent to one of skill in the art in possession of the present disclosure. However, while a specific server device 300 has been described, one of skill in the art in possession of the present disclosure will recognize that server devices (or other devices implementing the power backup device charging system of the present disclosure) may include a variety of components and/or component configurations for providing conventional functionality, as well as the functionality discussed below, while remaining within the scope of the present disclosure as well.

Figure 4:
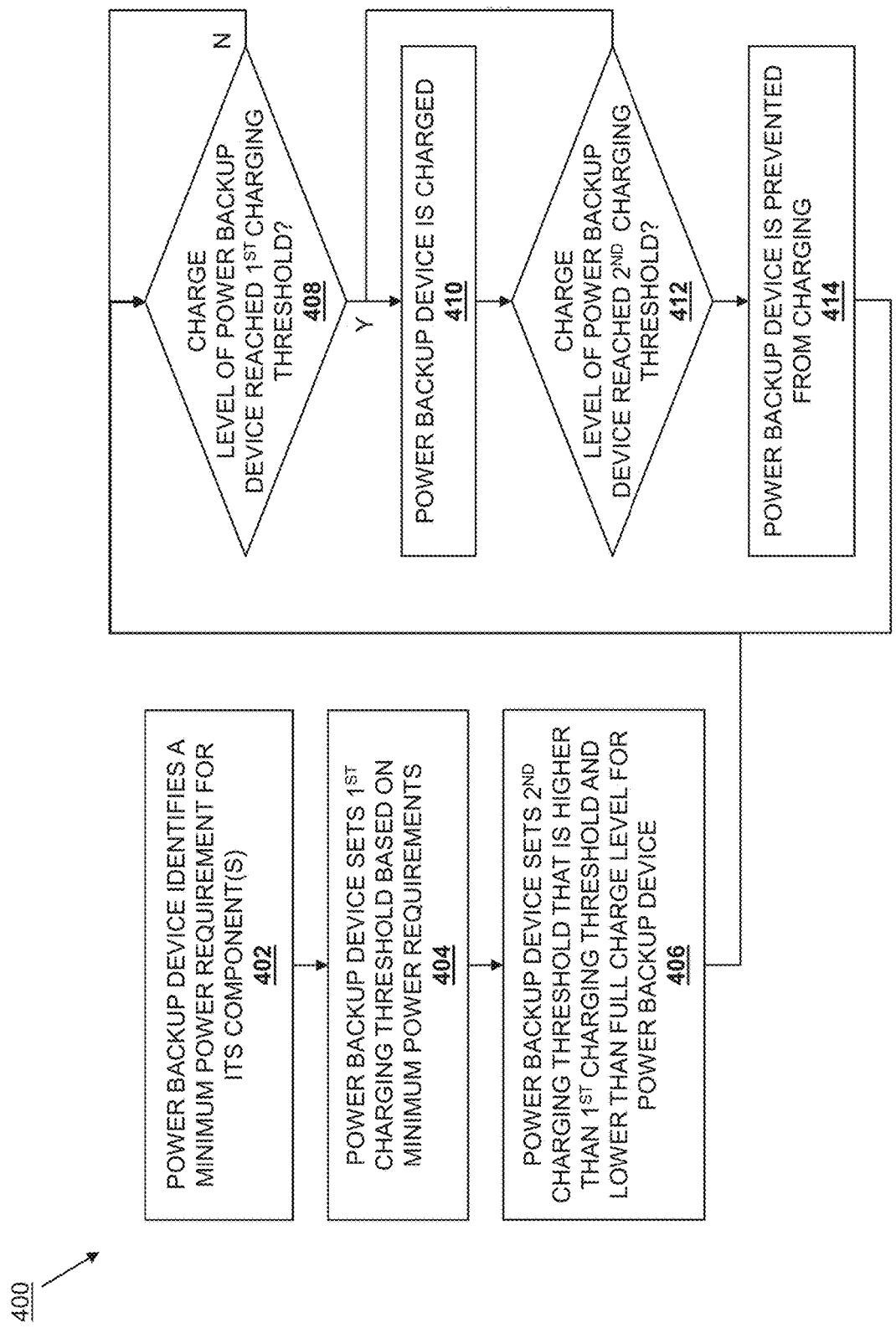
FIG. 4 is a flow chart illustrating an embodiment of a method for charging a power backup device.

Referring now to FIG. 4, an embodiment of a method 400 for charging a power backup device is illustrated. As discussed below, the systems and methods of the present disclosure extend the useful life of power backup devices via the repeated charging of those power backup devices to a charge level that is lower than a full charge level for that power backup device. For example, a power backup device is coupled to one or more components and a power supply system that is configured to supply power to the one or more components, and operates to identify a minimum power requirement for the one or more components, set a first charging threshold based on the minimum power requirement for the one or more components, and set a second charging threshold that is higher than the first charging threshold and that is lower than a full charge level for the power backup device. Subsequently, in response to a charge level of the power backup device reaching the first charging threshold, the power backup device is charged, and in response to the charge level of the power backup device reaching the second charging threshold, the power backup device is prevented from charging. The inventors of the present disclosure have determined that repeated charging of the power backup device to the second charging threshold, which is higher than the first charging threshold and lower than the full charge level for the power backup device, extends the useful life of the power backup device (e.g., a period of time in which the power backup device includes a charge capacity that is capable of meeting the minimum power requirements of the one or more components) and provides for a higher charge capacity over time compared to the charge capacity over time for power backup devices that are charged conventionally.

Figure 5A:
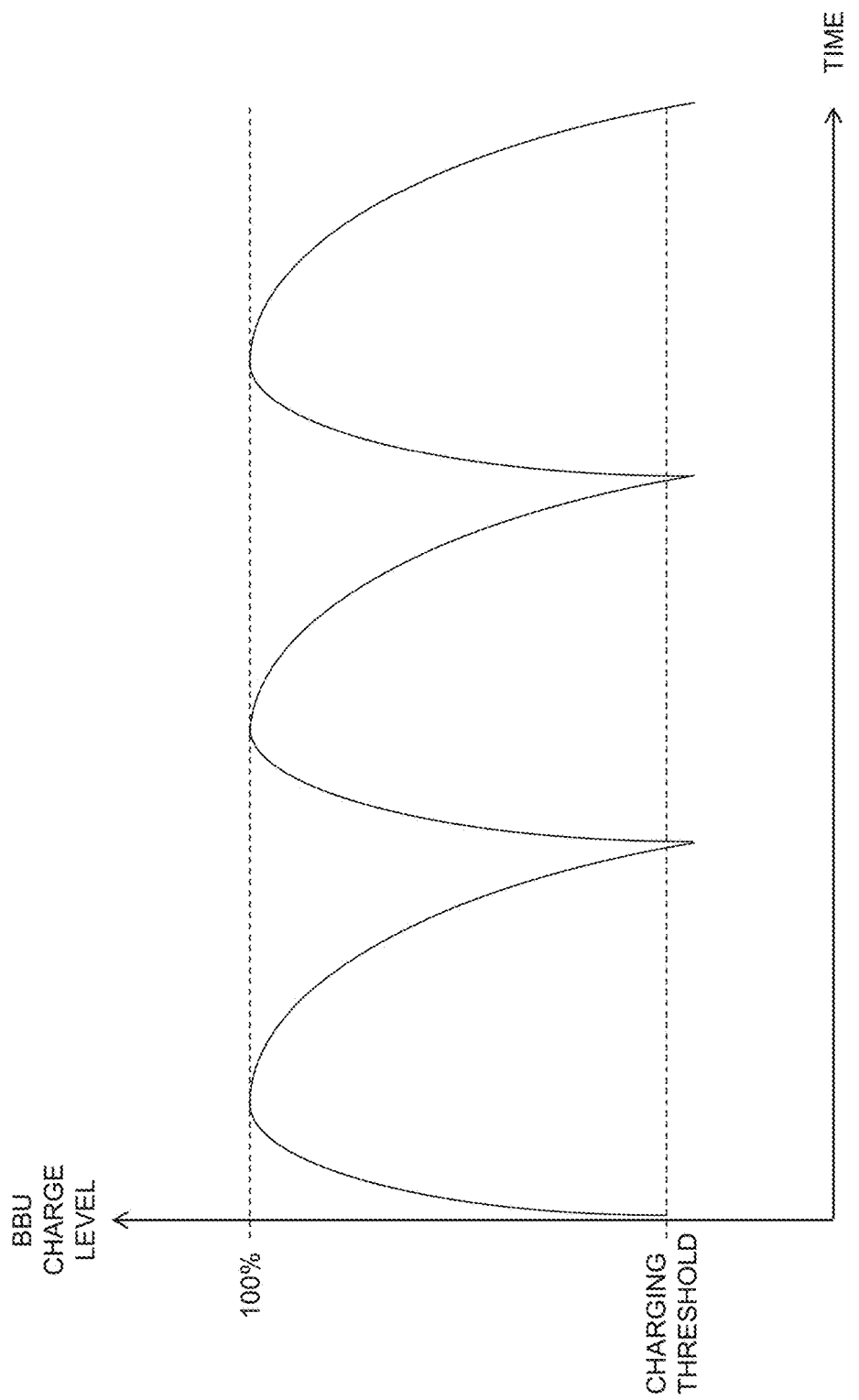
FIG. 5A is a graph illustrating an embodiment of conventional charging operations performed on a conventional power backup device.
Figure 5B:
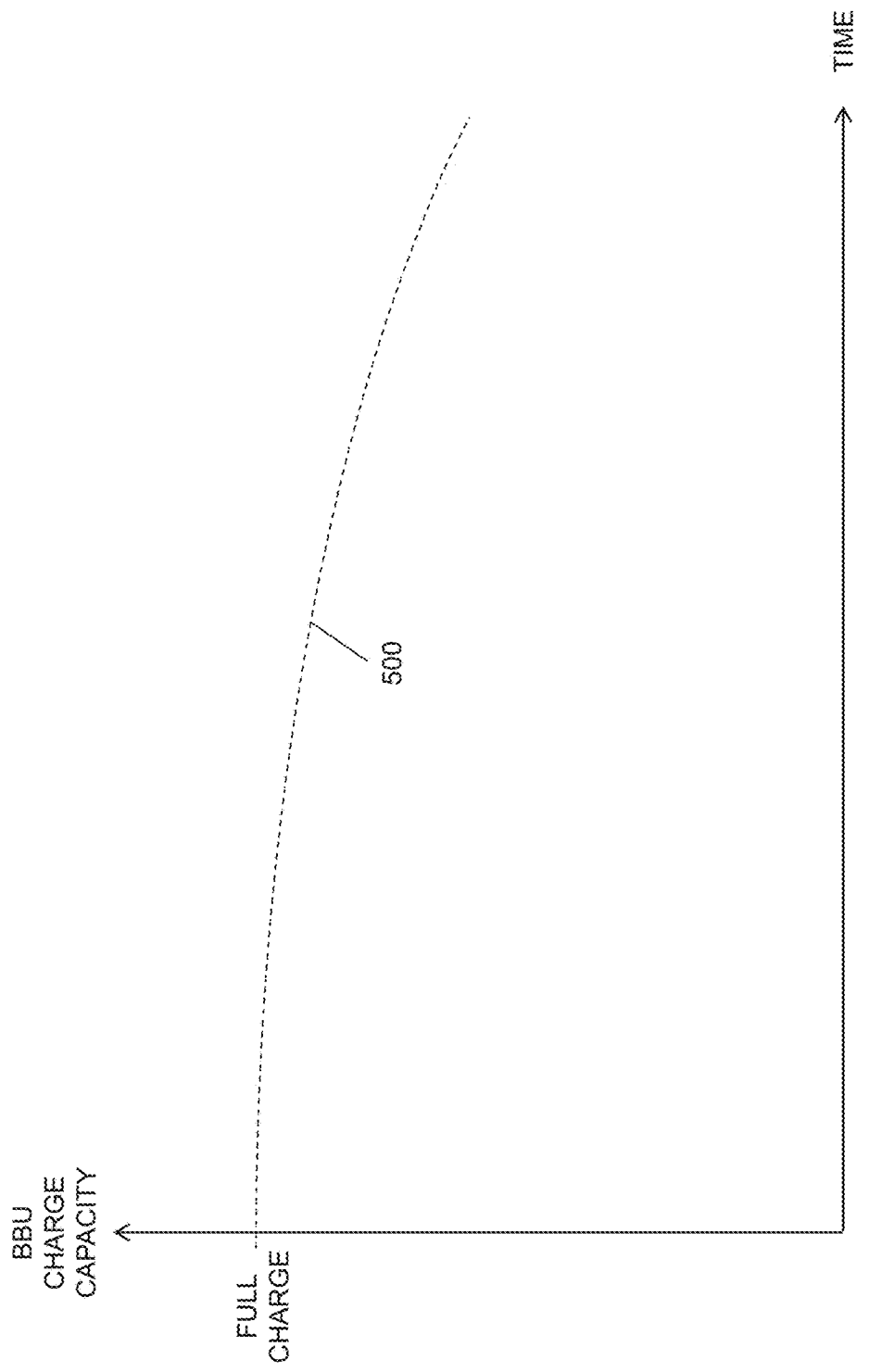
FIG. 5B is a graph illustrating an embodiment of power backup device charge capacity over time as a result of the conventional charging operations illustrated in FIG. 5A.

For example, FIGS. 5A and 5B illustrate an example of how conventional charging techniques effect the charge capacity of a BBU device over time. FIG. 5A illustrates a graph of BBU charge level on the Y-axis vs. time on the X-axis, with a charging threshold and 100% charge level indicated on the Y-axis for a particular BBU device. As will be appreciated by one of skill in the art in possession of the present disclosure, FIG. 5A illustrates how conventional charging operations charge the BBU device up to its 100% charge level, then allow the BBU charge level of the BBU device to dissipate (either due to use of the BBU device or passive BBU device charge dissipation) to the charging threshold, and then charge the BBU device back up to its 100% charge level, and one of skill in the art in possession of the present disclosure will appreciate how this process is repeated over the lifetime of the BBU device. FIG. 5B illustrates a graph of BBU charge capacity on the Y-axis vs. time on the X-axis, with a conventional full charge capacity curve 500 indicated for BBU devices that undergo the conventional charging operations illustrated in FIG. 5A. As will be appreciated by one of skill in the art in possession of the present disclosure, FIG. 5B indicates how the total amount of charge held by the BBU device at its full charge capacity reduces over time, and will eventually reach a BBU charge capacity that is incapable of meeting the minimum power requirements of the one or more components to which it provides power such that the BBU device must be replaced. As discussed in further detail below, the inventors of the present disclosure have determined that modification of the charging operations illustrated in FIG. 5A to the charging operations discussed below can reduce the BBU charge capacity degradation illustrated in FIG. 5B and extend the useful lifetime of the BBU device.

The method 400 begins at block 402 where a power backup device identifies a minimum power requirement for its component(s). In some embodiments, prior to the method 400, the server device 300 may be provided a "platform identifier" that may identify a platform to which the server device 300 belongs (e.g., a server device manufacturer may manufacture server devices with particular components and/or component types, and those server devices may be considered part of a server device platform that may be identified by the platform identifier.) For example, the platform identifier may be stored in the platform information database 314a as part of the manufacture of the server device 300, and may operate to distinguish the platform to which the server device 300 belongs from other platforms provided by the manufacturer of the server device 300.

Furthermore, the platform to which the server device 300 belongs may be associated with particular power requirements and/or power consumption, and prior to the method 400, the server device 300 may be provided a "minimum power requirement" that may identify a minimum power amount that the platform to which the server device 300 belongs requires from the BBU device 310 in order to perform power loss operations in the event power from the power supply system 304 becomes unavailable (e.g., a server device manufacturer may manufacture server devices with particular components and/or component types as part of the platform discussed above that require a minimum power amount to perform power loss operations (e.g., vaulting operations by memory devices as discussed above)). For example, the minimum power requirement may be stored in the power requirement information database 314b in association with the platform identifier discussed above as part of the manufacture of the server device 300, and may operate to distinguish the minimum power requirements for platform to which the server device 300 belongs from the minimum power requirements for other platforms provided by the manufacturer of the server device 300

Figure 6A:
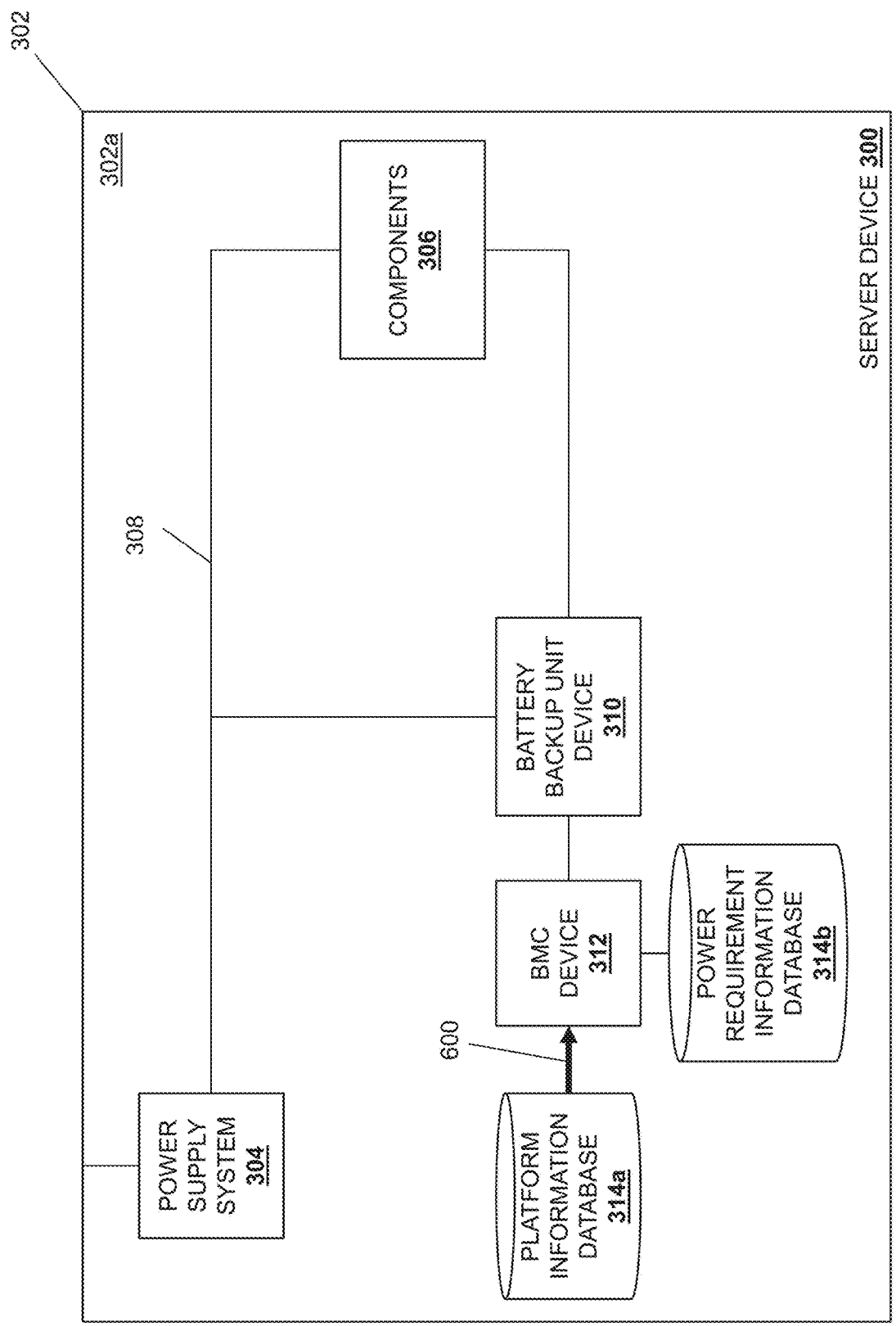
FIG. 6A is a schematic view illustrating an embodiment of the server device of FIG. 3 operating during the method of FIG. 4.
Figure 6B:
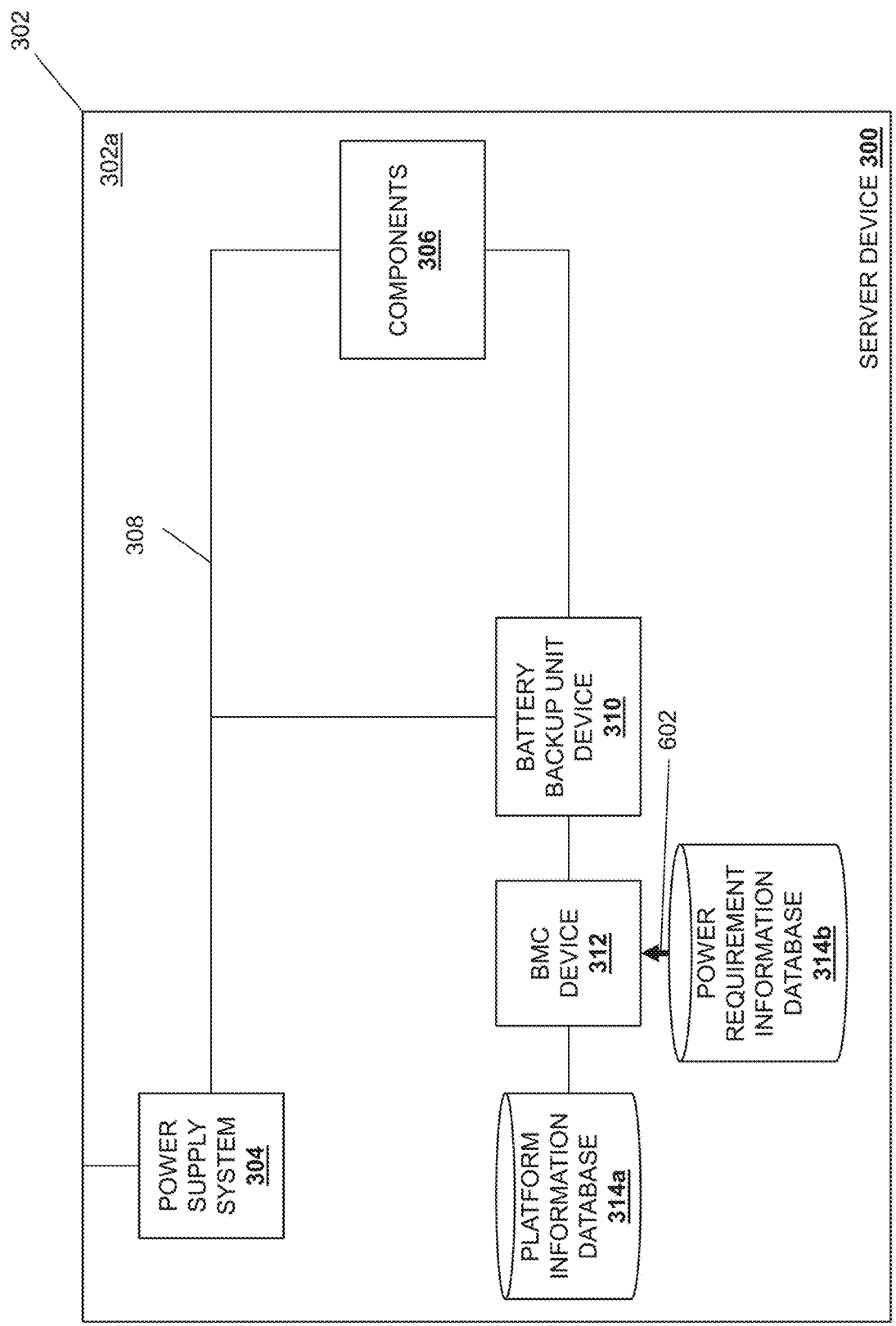
FIG. 6B is a schematic view illustrating an embodiment of the server device of FIG. 3 operating during the method of FIG. 4.

Thus, in an embodiment of block 402 and as illustrated in FIG. 6A, the BMC device 312 may perform retrieval operations 600 to retrieve the platform identifier stored in the platform information database 314a in order to identify the platform to which the server device belongs. As will be appreciated by one of skill in the art in possession of the present disclosure, server devices provided across different platforms may include different minimum power requirements, and the use of the platform identifier as discussed below allows the functionality of the power backup device charging system of the present disclosure to easily be provided in server devices that are included in different platforms. With reference to FIG. 6B, in response to retrieving the platform identifier, the BMC device 312 may then perform retrieval operations 602 that operate to use the platform identifier to retrieve the minimum power requirement(s) for the one or more component(s) 306 included in the server device 300 from the power requirement information database 314b.

With reference to the example provided above, the minimum power requirements retrieved at block 402 may identify a minimum charge level the BBU device 310 that will provide for a predetermined amount of ride-through time (typically 10 seconds) to a memory system in the server device 300 in the event of a power loss such that, in the event power is restored within that predetermined amount of ride-through time, the memory system operates without interruption while, in the event the power loss continues beyond that predetermined amount of ride-through time, the memory system begins vaulting operations that transfer the data on the memory system to a storage system (e.g., Solid State Drives (SSDs)) in the server device 300. However, while a specific minimum power requirement associated with a platform has been described, one of skill in the art in possession of the present disclosure will appreciate that the minimum power requirement retrieved at block 402 may be a minimum power requirement that is associated with a single component (i.e., rather than a server device or platform), and/or any combination of components, while remaining within the scope of the present disclosure as well.

Figure 6C:
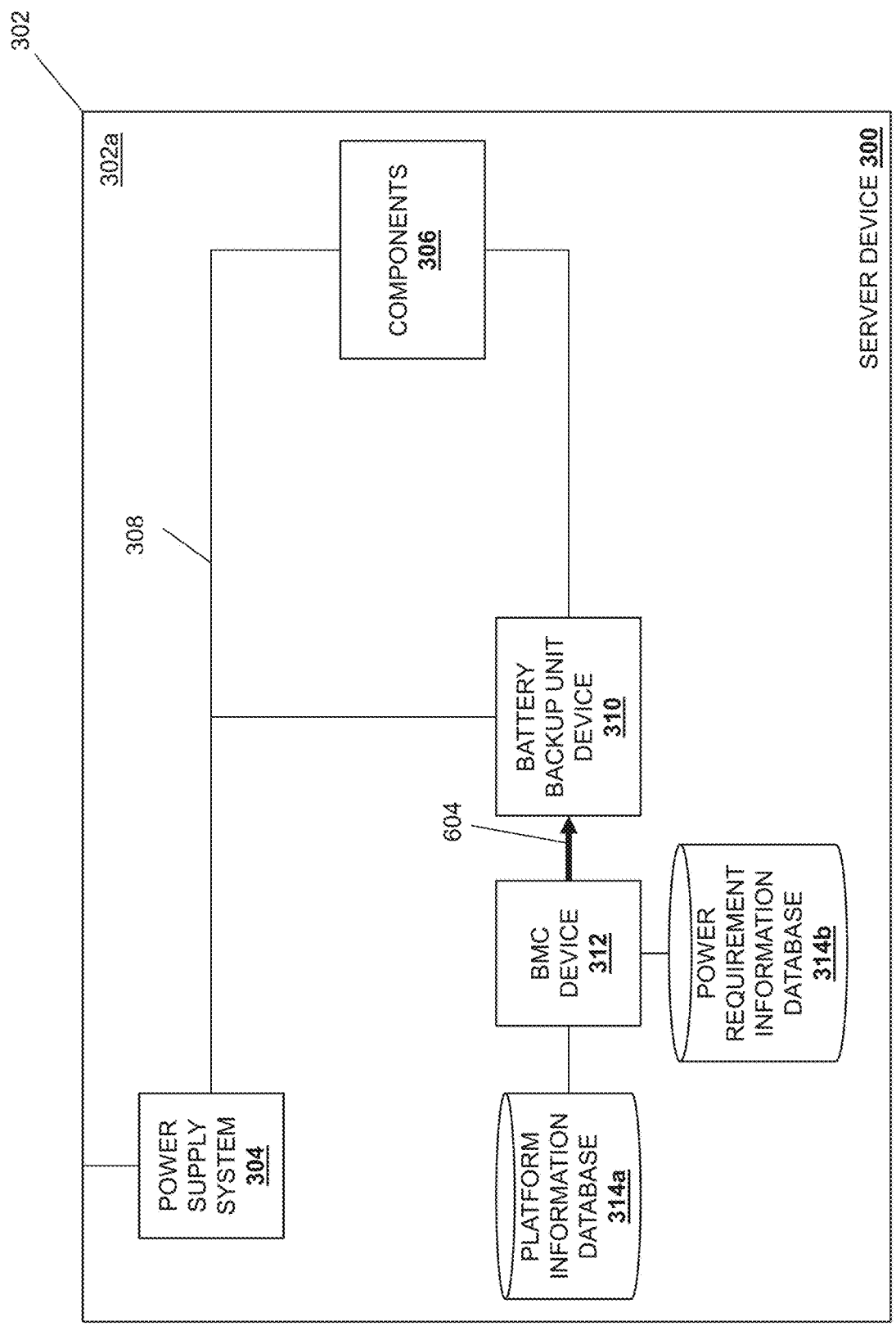
FIG. 6C is a schematic view illustrating an embodiment of the server device of FIG. 3 operating during the method of FIG. 4.

The method 400 may then proceed to block 404 where the power backup device sets a first charging threshold based on the minimum power requirements. In an embodiment, at block 404, the BMC device 312 may operate to cause a first charging threshold to be set in the BBU device 310 based on the minimum power requirements retrieved at block 404. For example, FIG. 6C illustrates how the BMC device 312 may perform charging threshold setting operations 604 that operate to send a first charging threshold instruction to the BBU device 310 that causes the first charging threshold to be set in the BBU device 310. In some embodiments, the BMC device 312 may determine the first charging threshold based on the minimum power requirements retrieved at block 404 by selecting a first charging threshold that is higher than the minimum power requirements to provide a "buffer" amount of charge that ensures that the BBU device 310 will always be charged to a charge level that is greater than the minimum power requirements retrieved at block 402, discussed in further detail below.

For example, the first charging threshold may be considered a "lower" charging threshold at which charging of the BBU device will begin, and may be higher than the minimum power requirements to account for, for example, possible delays in the beginning of such charging that could cause the charge level of the BBU device 310 to drop below that lower charging threshold. However, one of skill in the art in possession of the present disclosure will appreciate that the first charging threshold may be higher than the minimum power requirements by any amount determined in any manner that would be apparent to one of skill in the art in possession of the present disclosure, and in some cases may even be equal to the minimum power requirements. For example, in some embodiments, the platform identifier discussed above may be associated with the first charging threshold (rather than the minimum power requirements) in the power requirement information database 314b (e.g., the lower charging threshold may be determined during the manufacture of the server device 300 and stored in the power requirement database 314b.) Furthermore, while specific examples have been provided, the first charging threshold may be determined at block 404 in any other manner that would be apparent to one of skill in the art in possession of the present disclosure as well.

The method 400 then proceeds to block 406 where the power backup device sets a second charging threshold that is higher than the first charging threshold and lower than a full charge level for the power backup device. In an embodiment, at block 406, the BMC device 312 may operate to cause a second charging threshold to be set in the BBU device 310 that is higher than the first charging threshold set at block 404, and lower than a full charge level (e.g., a 100% charge level) for the BBU device 310. For example, the charging threshold operations 604 illustrated in FIG. 6C may be performed by the BMC device 312 to send a second charging threshold instruction to the BBU device 310 that causes the second charging threshold to be set in the BBU device 310 (in addition to the first charging threshold.) The second charging threshold may be considered a "higher" charging threshold at which charging of the BBU device will prevented. In different embodiments, the BMC device 312 may determine the second charging threshold in a variety of manners that would be apparent to one of skill in the art in possession of the present disclosure. For example, in some embodiments, the platform identifier discussed above may be associated with the second charging threshold in the power requirement information database 314b (e.g., the second charging threshold may be determined during the manufacture of the server device 300 and stored in the power requirement database 314b.)

In another example, the second charging threshold may be calculated as a predetermined percentage of the full charge level for the BBU device 310 (e.g., 75% of the full charge level of the BBU device), and one of skill in the art in possession of the present disclosure will recognize that such a predetermined percentage may be determined during server device manufacturing operations to produce a desired (reduced) rate of BBU charge capacity degradation, discussed in further detail below. In a specific example, a predetermined percentage may be identified that results in the desired (reduced) rate of BBU charge capacity degradation across a plurality of different BBU devices used in different server devices, and that predetermined percentage may be utilized to determine the second charging threshold at block 406. In yet another example, the second charging threshold may be determined as a predetermined charge level difference from the first charging threshold. In yet another example, the second charging threshold may be determined as a predetermined charge level difference from the full charge level of the BBU device 310. Furthermore, the second charging threshold may increase over time to compensate for the degradation of the charge capacity of the power backup device/BBU device 310. However, while a several examples have been provided one of skill in the art in possession of the present disclosure will appreciate that the second charging threshold that is lower than the full charge level of the BBU device 310 may include any of a variety of charging thresholds that may be determined in a variety of manners that will fall within the scope of the present disclosure While the setting of the first charging threshold and the second charging threshold at blocks 404 and 406 are illustrated and described as being performed by the BMC device 310, in other embodiments the BBU device 310 may operate at blocks 404 and 406 to set the first charging threshold and the second charging threshold at blocks 404 and 406. For example, the BBU device 310 may receive the minimum power requirements described above from the BMC device 312, and then perform the operations discussed above as being performed by the BMC device 312 to set the first charging threshold and the second charging threshold. In another example, the BBU device 310 may retrieve the minimum power requirements described above as being retrieved by the BMC device 312, and then perform the operations discussed above as being performed by the BMC device 312 to set the first charging threshold and the second charging threshold. As such, one of skill in the art in possession of the present disclosure will recognize that the setting of the first/lower charging threshold and the second/higher charging threshold discussed above may be performed in a variety of manners that will fall within the scope of the present disclosure as well.

The method 400 then proceeds to decision block 408 where it is determined whether a charge level of the power backup device has reached the first charging threshold. Following the setting of the first charging threshold and the second charging threshold at blocks 404 and 406, the method 400 may then proceed to perform power backup device charge monitoring and "pulse" charging operations. In an embodiment, at decision block 408, the BBU device 310 may operate according to the first charging threshold to determine whether the charge level of the BBU device 310 has reached the first charging threshold. As will be appreciated by one of skill in the art in possession of the present disclosure, prior to decision block 408, the BBU device 310 will include a charge level that is higher than the first charging threshold, and thus the determination at decision block 408 operates to determine whether the charge level of the BBU device 310 has dropped to (or below) the first charging threshold. As will be appreciated by one of skill in the art in possession of the present disclosure, power backup devices such as the BBU device 310 may include any of a variety of charge level monitoring subsystems that operate to identify a current charge level of the power backup device/BBU device 310, and the power backup device/BBU device 310 may be configured to compare that current charge level against the first charging threshold at decision block 408 using a variety of techniques that will fall within the scope of the present disclosure as well.

Figure 6D:
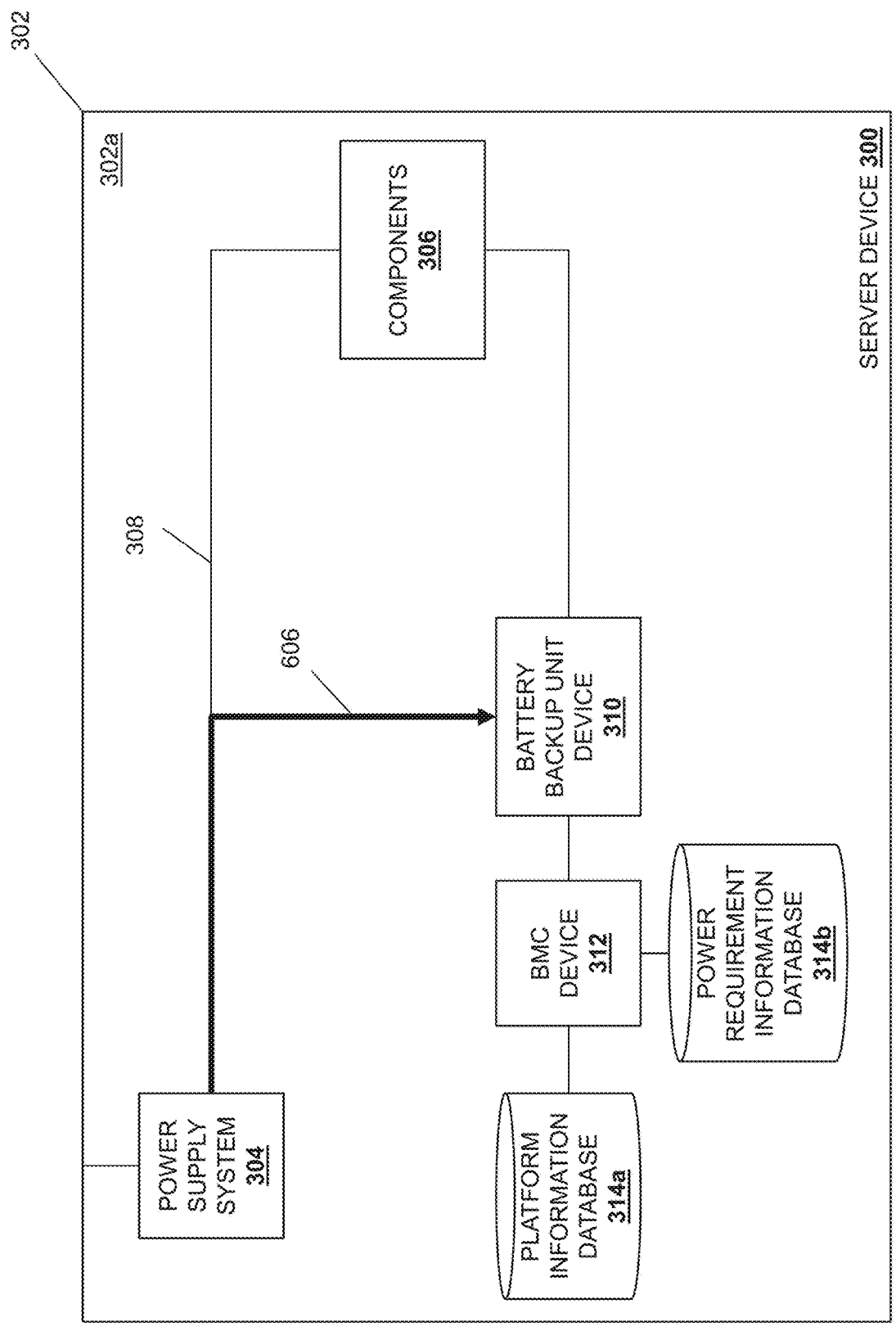
FIG. 6D is a schematic view illustrating an embodiment of the server device of FIG. 3 operating during the method of FIG. 4.

If, at decision block 408, it is determined that the charge level of the power backup device has not reached the first charging threshold, the method 400 returns to decision block 408. As such, the method 400 may loop through decision block 408 to monitor the BBU device 310 to determine whether its current charge level has dropped to (or below) the first/lower charging threshold as long as that current charge level is above the first/lower charging threshold. If, at decision block 408, it is determined that the charge level of the power backup device has reached the first charging threshold, the method 400 proceeds to block 410 where the power backup device is charged. In an embodiment, at block 410 and in response to determining that the current charge level of the BBU device 310 has dropped to (or below) the first/lower charging threshold, the BBU device 310 begins charging operations. With reference to FIG. 6D, at block 410, the BBU device 310 may operate to perform charging operations 606 that charge the BBU device 310 with power from the power supply system 304 in order to increase the charge level of the BBU device 310. As will be appreciated by one of skill in the art in possession of the present disclosure, power backup devices such as the BBU device 310 may include any of a variety of charging subsystems that operate to provide for charging of the power backup device/BBU device 310 from a power supply system, and the power backup device/BBU device 310 may be configured to charge itself at block 410 using a variety of techniques that will fall within the scope of the present disclosure as well.

The method 400 then proceeds to decision block 412 where it is determined whether a charge level of the power backup device has reached the second charging threshold. In an embodiment, at decision block 412, the BBU device 310 may operate according to the second charging threshold to determine whether the charge level of the BBU device 310 has reached the second charging threshold. As will be appreciated by one of skill in the art in possession of the present disclosure, prior to decision block 412, the BBU device 310 will be charging according to block 410, and thus the determination at decision block 412 operates to determine whether the charge level of the BBU device 310 has increased to (or above) the second charging threshold. As will be appreciated by one of skill in the art in possession of the present disclosure, power backup devices such as the BBU device 310 may include any of a variety of charge level monitoring subsystems that operate to identify a current charge level of the power backup device/BBU device 310, and the power backup device/BBU device 310 may be configured to compare that current charge level against the second charging threshold at decision block 412 using a variety of techniques that will fall within the scope of the present disclosure as well. If, at decision block 412, it is determined that the charge level of the power backup device has not reached the second charging threshold, the method 400 returns to block 410. As such, the method 400 may loop through block 410 and decision block 412 to continue to the charge the BBU device 310 as along as the charge level of the BBU device has not increased to (or above) the second/higher charging threshold.

If, at decision block 412, it is determined that the charge level of the power backup device has reached the second charging threshold, the method 400 proceeds to block 414 where the power backup device is prevented from charging. In an embodiment, at block 414 and in response to determining that the current charge level of the BBU device 310 has increased to (or above) the second/higher charging threshold, the BBU device 310 ceases or otherwise prevents charging operations. With reference to FIG. 6D, at block 414, the BBU device 310 may operate to prevent or otherwise cease the charging operations 606 such that the BBU device 310 is not charged with power from the power supply system 304 and the charge level of the BBU device 310 is not increased to the full charge level of the BBU device 310. As discussed above, power backup devices such as the BBU device 310 may include any of a variety of charging subsystems that operate to provide for charging of the power backup device/BBU device 310 from a power supply system, and the power backup device/BBU device 310 may be configured to prevent itself from charging at block 414 using a variety of techniques that will fall within the scope of the present disclosure as well. The method 400 then returns to decision block 408.

Figure 6E:
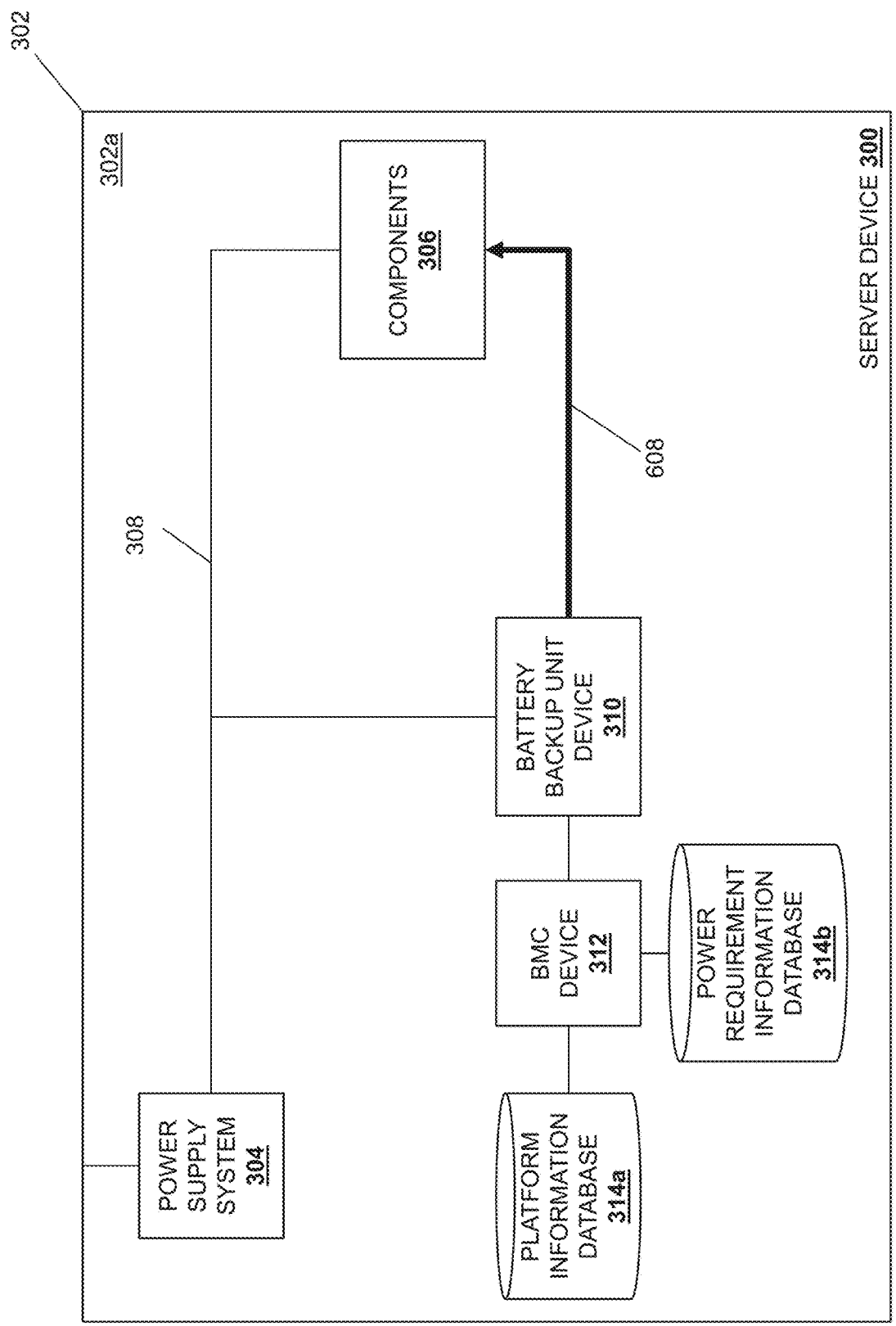
FIG. 6E is a schematic view illustrating an embodiment of the server device of FIG. 3 operating during the method of FIG. 4.

As such, the method 400 may operate to begin charging operations on the power backup device/BBU device 310 whenever the charge level of the power backup device/BBU device 310 drops to (or below) the first/lower charging threshold, charge the power backup device/BBU device 310 up to the second charging threshold (and below the full charge level of the power backup device/BBU device 310), and then cease charging operations once the charge level of the power backup device/BBU device 310 increases to (or above) the second/higher charging threshold. Furthermore, FIG. 6E illustrates how, at any time during the method 400, the BBU device 310 may perform power delivery operations 608 to provide power stored in the BBU device 310 to the components 306. For example, power from the power supply system 304 via the power supply coupling 308 may become unavailable and, in response, the components 306 may draw power from the BBU device 310 via the power delivery operations 608.

With reference to the specific example provided above, the method 400 operates to ensure that the charge level of the BBU device is above the minimum charging requirements and the first/lower charging threshold, which may operate to provide a sufficient amount of power in the BBU device 310 that will provide for a predetermined amount of ride-through time (typically 10 seconds) to a memory system in the server device 300 in the event of a power loss such that, in the event power is restored within that predetermined amount of ride-through time, the memory system operates without interruption while, in the event the power loss continues beyond that predetermined amount of ride-through time, the memory system may complete vaulting operations that transfer the data on the memory system to a storage system (e.g., Solid State Drives (SSDs)) in the server device 300.

Figure 7A:
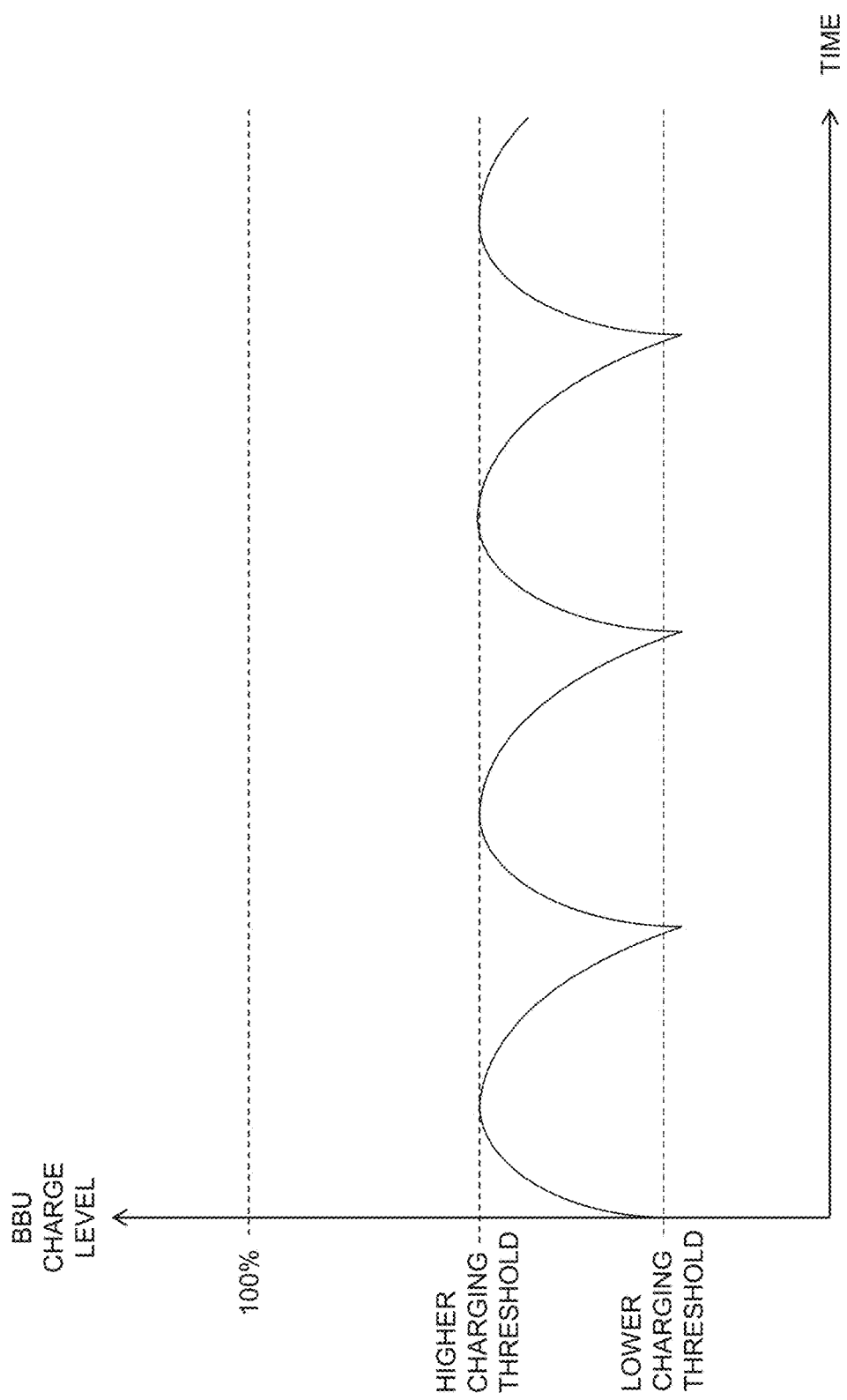
FIG. 7A is a graph illustrating an embodiment of charging operations performed according to the teachings of the present disclosure and during the method of FIG. 4.
Figure 7B:
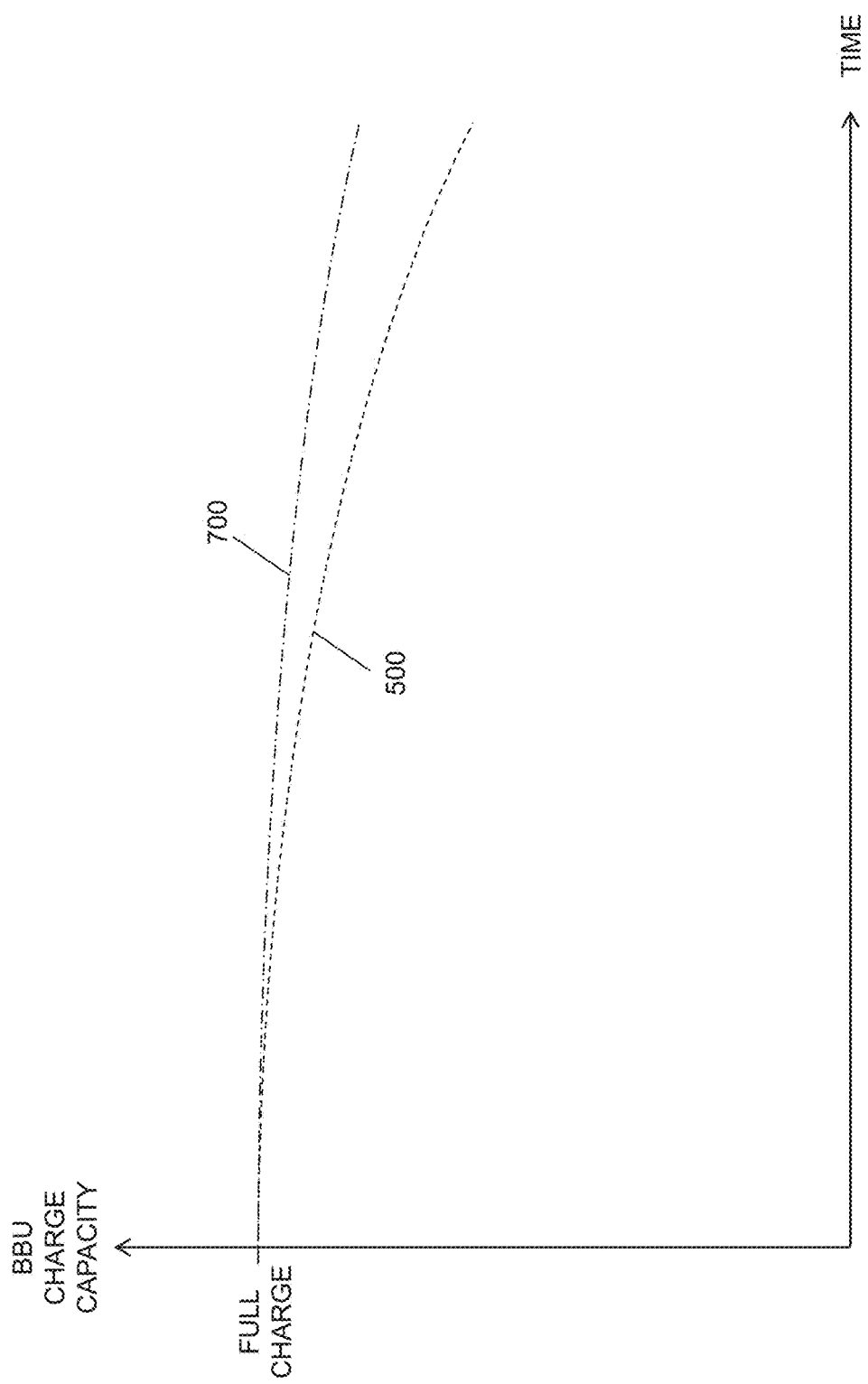
FIG. 7B is a graph illustrating an embodiment of power backup device charge capacity over time as a result of the charging operations illustrated in FIG. 7A.

With reference to FIGS. 7A and 7B, an example is illustrated of how the charging techniques of the present disclosure effect the charge capacity of a BBU device. FIG. 7A illustrates a graph of BBU charge level on the Y-axis vs. time on the X-axis, with a first/lower charging threshold, a second/higher charging threshold, and 100% charge level indicated on the Y-axis for a particular BBU device. As will be appreciated by one of skill in the art in possession of the present disclosure, FIG. 7A illustrates how charging operations of the present disclosure charge the BBU device up to its second/higher charging threshold, then allow the BBU charge level of the BBU device to dissipate (either due to use of the BBU device or passive BBU device charge dissipation) to the first/lower charging threshold, and then charge the BBU device back up to its second/higher charging threshold, and this process may be repeated over the lifetime of the BBU device. FIG. 7B illustrates a graph of BBU charge capacity on the Y-axis vs. time on the X-axis, with a full charge capacity curve 700 indicated for BBU devices that undergo the charging operations of the present disclosure illustrated in FIG. 7A, as compared with the conventional full charge capacity curve 500 discussed above with reference to FIG. 5B.

As can be seen in FIG. 7B, the total amount of charge held by the BBU device at its full charge capacity reduces over time at a lower rate when that BBU device is charged according to the teachings of the present disclosure as compared to when that BBU device is charged conventionally, and thus BBU devices that are charged according to the teachings of the present disclosure will have a longer lifespan than conventionally charged BBU devices (i.e., BBU devices that are charged according to the teachings of the present disclosure will reach a BBU charge capacity that is incapable of meeting the minimum power requirements of the one or more components to which it provides power slower than conventionally charged BBU devices such that the BBU device that are charged according to the teachings of the present disclosure must be replaced later than BBU devices that are charged conventionally.) Furthermore, one of skill in the art in possession of the present disclosure will appreciate that power backup device/BBU device charge capacity degradation increases as the temperature at which the power backup device/BBU device is utilized increases, and the reductions in the degradation of power backup device/BBU device charge capacity discussed above have been found to be achievable at such higher temperatures as well.

Thus, systems and methods have been described that extend the useful life of BBU devices via the repeated charging of those BBU devices to a charge level that is lower than a full charge level for that BBU device. For example, a BBU device is coupled to one or more components and a power supply system that is configured to supply power to the one or more components, and operates to identify a minimum power requirement for the one or more components, set a first charging threshold based on the minimum power requirement for the one or more components, and set a second charging threshold that is higher than the first charging threshold and that is lower than a full charge level for the BBU device. Subsequently, in response to a charge level of the BBU device reaching the first charging threshold, the BBU device is charged, and in response to the charge level of the BBU device reaching the second charging threshold, the BBU device is prevented from charging. The inventors of the present disclosure have determined that repeated charging of the BBU device to the second charging threshold, which is higher than the first charging threshold and lower than the full charge level for the BBU device, extends the useful life of the BBU device (e.g., a period of time in which the BBU device includes a charge capacity that is capable of meeting the minimum power requirements of the one or more components) and provides for a higher charge capacity over time compared to the charge capacity over time of BBU devices that are charged conventionally.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power backup device charging system, comprising:
   a computing device including one or more components;
   a power supply system that is included in the computing device, that is coupled to the one or more components, and that is configured to supply power to the one or more components;
   a Baseboard Management Controller (BMC) device included in the computing device and that is coupled to the power backup device, wherein the BMC device is configured to;
      retrieve a platform identifier that identifies a platform to which the computing device belongs;
      identify, using the platform identifier, a minimum power required for the one or more components to perform power loss operations; and
      determine a first charging threshold that provides a power amount that exceeds the minimum power required for the one or more components to perform the power loss operations; and
   a power backup device that is coupled to the one or more components, the BMC device, and the power supply system, wherein the power backup device is configured to:
      receive, from the BMC device, the first charging threshold;
      set, in the power backup device, the first charging threshold;
      set, in the power backup device, a second charging threshold that is higher than the first charging threshold and lower than a full charge level for the power backup device;
      charge, in response to a charge level of the power backup device reaching the first charging threshold, the power backup device; and
      prevent, in response to the charge level of the power backup device reaching the second charging threshold, charging of the power backup device.

2. The system of claim 1, wherein the BMC device is configured to:
   identify, using the platform identifier, the second charging threshold; and
   provide, to the power backup device, the second charging threshold.

3. The system of claim 2, wherein the second charging threshold is configured to produce a predetermined rate of charge capacity degradation across each of a plurality of power backup devices included in different computing devices that belong to the platform.

4. The system of claim 1, wherein the setting of the first charging threshold and the second charging threshold includes:
   receiving, from, one or more charging threshold setting instructions that provide for the setting of the first charging threshold and the second charging threshold.

5. The system of claim 1, wherein repeated charging of the power backup device to the second charging threshold that is lower than the full charge level for the power backup device is configured to reduce the degradation of the charge capacity of the power backup device relative to repeated charging the power backup device to a full charging threshold that is substantially equal to the full charge level for the power backup device.

6. The system of claim 1, wherein the second charging threshold is 75% of a full charge level for the power backup device.

7. The system of claim 1, wherein the power backup device is configured to:
   provide, in response to a loss of power from the power supply system to the one or more components, power to the one or more components.

8. An Information Handling System (IHS), comprising:
   a Baseboard Management Controller (BMC) processing system; and
   a BMC memory system that is coupled to the BMC processing system and that includes instructions that, when executed by the BMC processing system, cause the BMC processing system to provide a BMC engine that is configured to:
      retrieve a platform identifier that identifies a platform to which the IHS belongs;
      identify, using the platform identifier, a minimum power required for the one or more components in the IHS to perform power loss operations; and
      determine a first charging threshold that provides a power amount that exceeds the minimum power required for the one or more components to perform the power loss operations; and
   a power backup device processing system; and
   a power backup device memory system that is coupled to the power backup device processing system and that includes instructions that, when executed by the power backup device processing system, cause the power backup device processing system to provide a power backup device charging engine that is configured to:
      receive, from the BMC device, the first charging threshold;
      set, in the power backup device charging engine, the first charging threshold;
      set, in the power backup device charging engine, a second charging threshold that is higher than the first charging threshold and lower than a full charge level for the power backup device;
      charge, in response to a charge level of the power backup device reaching the first charging threshold, the power backup device; and
      prevent, in response to the charge level of the power backup device reaching the second charging threshold, charging of the power backup device.

9. The IHS of claim 8, wherein the engine is configured to:
   identify, using the platform identifier, the second charging threshold; and
   provide, to the power backup device charging engine, the second charging threshold.

10. The IHS of claim 8, wherein the setting of the first charging threshold and the second charging threshold includes:
    receiving, from the BMC engine, one or more charging threshold setting instructions that provide for the setting of the first charging threshold and the second charging threshold.

11. The IHS of claim 8, wherein repeated charging of the power backup device to the second charging threshold that is lower than the full charge level for the power backup device is configured to reduce the degradation of the charge capacity of the power backup device relative to repeated charging the power backup device to a full charging threshold that is substantially equal to the full charge level for the power backup device.

12. The IHS of claim 8, wherein the second charging threshold is configured to produce a predetermined rate of charge capacity degradation across each of a plurality of power backup devices included in different computing devices that belong to the platform.

13. The IHS of claim 8, wherein the power backup device charging engine is configured to:
provide, in response to a loss of power from a power supply system to the one or more components, power to the one or more components.

14. A method for charging a power backup device, comprising:
retrieving, by a Baseboard Management Controller (BMC) device included in a computing device, a platform identifier that identifies a platform to which the computing device belongs;
identifying, by the BMC device using the platform identifier, a minimum power required for one or more components included in the computing device to perform power loss operations;
determining, by the BMC device, a first charging threshold that provides a power amount that exceeds the minimum power required for the one or more components to perform the power loss operations;
receiving, by a power backup device include in the computing device, a minimum power requirement for the one or more components;
setting, by the power backup device based in the power backup device, the first charging threshold;
setting, by the power backup device in the power backup device, a second charging threshold that is higher than the first charging threshold and lower than a full charge level for the power backup device;
charging, by the power backup device in response to a charge level of the power backup device reaching the first charging threshold, the power backup device; and
preventing, by the power backup device in response to the charge level of the power backup device reaching the second charging threshold, charging of the power backup device.

15. The method of claim 14, further comprising:
identifying, by the BMC device using the platform identifier, the second charging threshold; and
providing, by the BMC device to the power backup device, the second charging threshold.

16. The method of claim 15, wherein the second charging threshold is configured to produce a predetermined rate of charge capacity degradation across each of a plurality of power backup devices included in different computing devices that belong to the platform.

17. The method of claim 14, wherein the setting of the first charging threshold and the second charging threshold includes:
receiving, by the power backup device from the BMC device, one or more charging threshold setting instructions that provide for the setting of the first charging threshold and the second charging threshold.

18. The method of claim 14, wherein repeated charging of the power backup device to the second charging threshold that is lower than the full charge level for the power backup device is configured to reduce the degradation of the charge capacity of the power backup device relative to repeated charging the power backup device to a full charging threshold that is substantially equal to the full charge level for the power backup device.

19. The method of claim 14, wherein the second charging threshold is 75% of a full charge level for the power backup device.

20. The method of claim 14, further comprising:
providing, power backup device in response to a loss of power from the power supply system to the one or more components, power to the one or more components.

* * * * *

UNITED STATES PATENT AND TRADEMARK OFFICE
CERTIFICATE OF CORRECTION

| | |
|---|---|
| PATENT NO. | : 11,435,796 B2 |
| APPLICATION NO. | : 16/902093 |
| DATED | : September 6, 2022 |
| INVENTOR(S) | : Dong et al. |

It is certified that error appears in the above-identified patent and that said Letters Patent is hereby corrected as shown below:

In the Claims

Claim 4, Column 13, Line 61, "receiving, from," should be changed to --receiving, from the BMC,--;
Claim 9, Column 14, Line 51, "The IHS of claim 8, wherein the engine is configured" should be changed to --The IHS of claim 8, wherein the BMC engine is configured--.

Signed and Sealed this
First Day of November, 2022

Katherine Kelly Vidal
*Director of the United States Patent and Trademark Office*